(12) United States Patent
Orlov et al.

(10) Patent No.: US 11,486,242 B2
(45) Date of Patent: Nov. 1, 2022

(54) METHODS FOR TARGETED CHEMICAL TREATMENT OF WELL BORES

(71) Applicant: SAUDI ARABIAN OIL COMPANY, Dhahran (SA)

(72) Inventors: Maxim Orlov, Moscow (RU); Timur Zharnikov, Moscow (RU); Vera Solovyeva, Moscow (RU); Tao Chen, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/159,787

(22) Filed: Jan. 27, 2021

(65) Prior Publication Data

US 2022/0235644 A1 Jul. 28, 2022

(51) Int. Cl.
*E21B 43/27* (2006.01)
*C09K 8/74* (2006.01)
*C09K 8/72* (2006.01)

(52) U.S. Cl.
CPC .............. *E21B 43/27* (2020.05); *C09K 8/725* (2013.01); *C09K 8/74* (2013.01)

(58) Field of Classification Search
CPC ............ E21B 43/27; C09K 8/725; C09K 8/74
See application file for complete search history.

(56) References Cited

U.S. PATENT DOCUMENTS

| 4,986,354 | A | * | 1/1991 | Cantu | C09K 8/516 |
|---|---|---|---|---|---|
| | | | | | 166/279 |
| 5,458,860 | A | | 10/1995 | Morris et al. | |
| 6,207,620 | B1 | | 3/2001 | Gonzalez et al. | |
| 6,279,656 | B1 | | 8/2001 | Sinclair et al. | |
| 6,444,316 | B1 | | 9/2002 | Reddy et al. | |
| 7,196,040 | B2 | | 3/2007 | Heath et al. | |
| 7,358,226 | B2 | | 4/2008 | Dayton et al. | |
| 7,431,088 | B2 | | 10/2008 | Moorehead et al. | |
| 8,047,282 | B2 | | 11/2011 | Lewis et al. | |
| 9,518,210 | B2 | | 12/2016 | Ezell et al. | |
| 10,010,709 | B2 | | 7/2018 | Kohane et al. | |
| 10,093,851 | B2 | | 10/2018 | Chang et al. | |
| 10,144,857 | B2 | | 12/2018 | Cadix | |
| 10,246,565 | B2 | | 4/2019 | Nowak et al. | |

(Continued)

FOREIGN PATENT DOCUMENTS

EA 034768 B1 3/2020
WO 2017018998 A1 2/2017

OTHER PUBLICATIONS

International Search Report and Written Opinion issued in Application No. PCT/US2022/014048, dated May 2, 2022 (12 pages).

*Primary Examiner* — Silvana C Runyan
(74) *Attorney, Agent, or Firm* — Osha Bergman Watanabe & Burton LLP

(57) ABSTRACT

A method for wellbore treatment. The method including preparing an encapsulated treatment agent via polymerization, feeding the encapsulated treatment agent into the wellbore, delivering the encapsulated treatment agent to a desired depth within a formation in the wellbore, activating an acoustic or an electromagnetic source at the desired depth within the formation, and generating an acoustic field or an electromagnetic field. The acoustic field or electromagnetic field activates the encapsulant thereby releasing the treatment agent into the wellbore and a desired depth.

9 Claims, 1 Drawing Sheet

(56) References Cited

U.S. PATENT DOCUMENTS

| | | |
|---|---|---|
| 10,487,255 B1 | 11/2019 | Bai et al. |
| 10,501,687 B2 | 12/2019 | Johnson et al. |
| 10,626,321 B2 * | 4/2020 | Nguyen ................ E21B 43/267 |
| 10,793,769 B2 * | 10/2020 | Nguyen .................... C09K 8/82 |
| 2003/0196808 A1 * | 10/2003 | Blauch ..................... C09K 8/72 |
| | | 166/300 |
| 2012/0015852 A1 | 1/2012 | Quintero et al. |
| 2012/0325471 A1 | 12/2012 | Mukhopadhyay |
| 2014/0069644 A1 | 3/2014 | Reddy et al. |
| 2016/0032169 A1 | 2/2016 | Chew et al. |
| 2017/0044884 A1 | 2/2017 | Mahmoud et al. |
| 2018/0298274 A1 | 10/2018 | Zhao |
| 2019/0382653 A1 | 12/2019 | Borrell et al. |

* cited by examiner

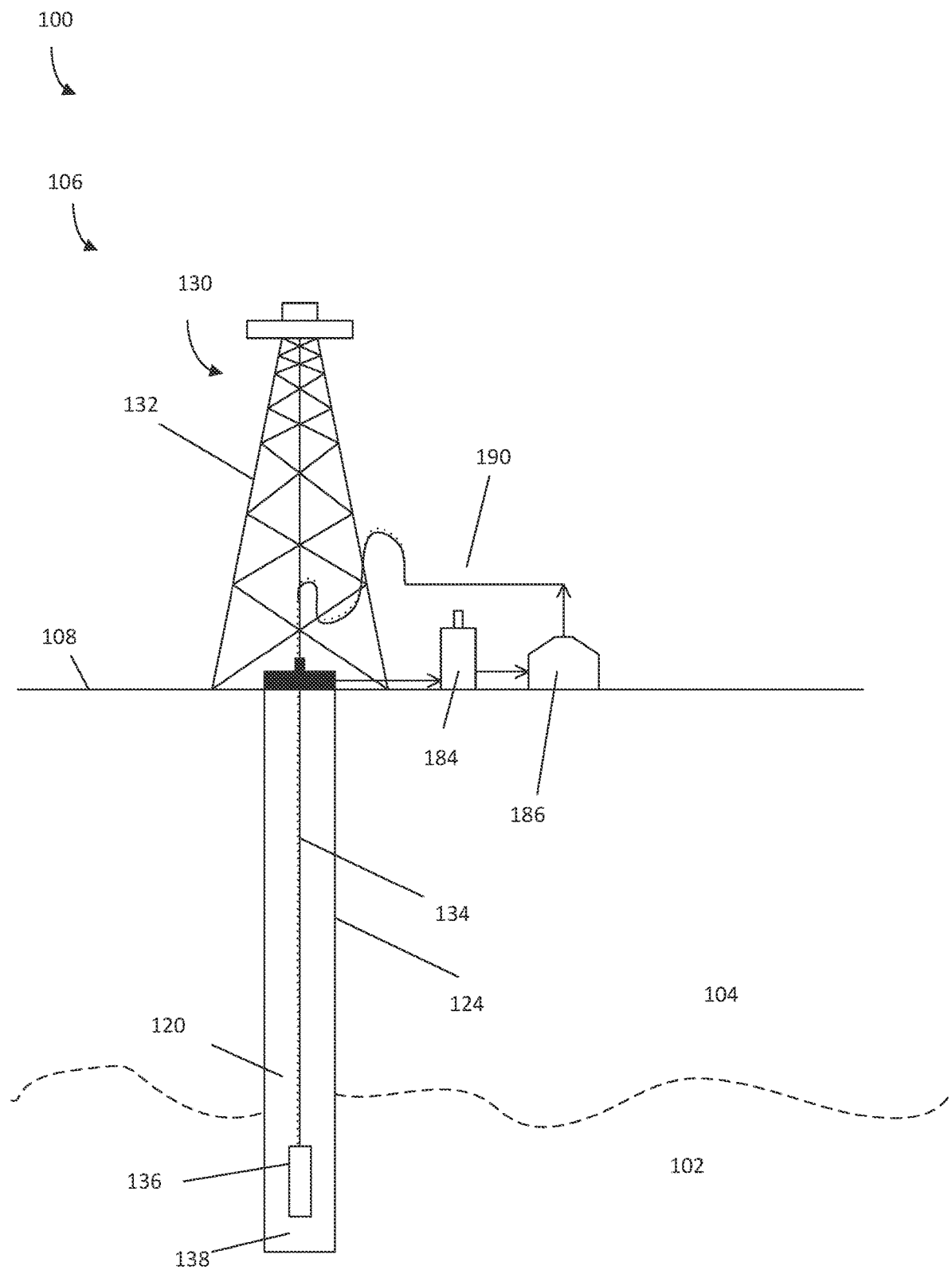

METHODS FOR TARGETED CHEMICAL TREATMENT OF WELL BORES

FIELD OF THE DISCLOSURE

Embodiments of the present disclosure generally relate to methods and systems for targeted chemical treatment of well bores. The system includes at least one acoustic or electromagnetic (EM) source, systems for introducing the microcapsules containing chemical agents, or treatment agents, into the borehole and transporting the agents to the treatment zone.

BACKGROUND

The production of hydrocarbons can be stimulated by removing filter cake (descaling) from the wall of a well bore and/or the face of the hydrocarbon-bearing formation, and by forming wormholes into the hydrocarbon-bearing formation (acidizing). Such fluid pathways allow hydrocarbons to traverse from the hydrocarbon-bearing formation, and the wormholes can access previously inaccessible, fluidly isolated portions the hydrocarbon-bearing formation. Acids, including hydrofluoric acid and hydrochloric acid, are well known in the art to achieve such goals. The acids react with the portions of the filter cake and the hydrocarbon-bearing formation susceptible to acid degradation upon contact.

One problem with using a strong acid in a hydrocarbon-bearing formation is that the filter cake removal may be non-uniform due to differences in the composition of the filter cake, leaving the face of the hydrocarbon-bearing formation with blockages. Another issue is that strong acids tend to react with the formation in an instantaneous manner upon contact due to the amount of acid-reactive material present. This results in the depletion of the strong acid species almost immediately upon contact with the formation, resulting in the creation of wide, shallow (that is, not penetrating deep into the formation relative to the distance from the well bore) and non-uniform wormholes through the hydrocarbon-bearing formation. These shallow wormholes are not the desirable deep fluid pathways through the hydrocarbon-bearing formation that act as tributaries for the well bore and enhance the rate and efficiency of hydrocarbon extraction.

Esters of acids have been used to overcome such problems of strong acids reacting too quickly and unevenly with both the filter cake and the hydrocarbon-bearing formation. Esters of acids can hydrolyze in the presence of water into organic acids to form acidic solutions. As an acidic solution forms, the resulting acid is consumed, which drives the reversible hydrolysis reaction to completion. The hydrolysis rate is determined by the type of ester and the temperature of the aqueous solution.

However, the amount of time that an ester is stable before hydrolyzation may not be sufficient to deliver the ester of the acid to the desired treatment site. Well bores in modern practice are extended horizontally for distances up to and beyond 30 kilometers from a single vertical well.

Other attempts to improve such systems and overcome the problems therewith, such as those described in U.S. Pat. No. 6,207,620, use systems for introducing an encapsulated formation etching agent in a well bore. The encapsulant is designed to release the formation etchings agent under predetermined environmental conditions such as a temperature, pressure, PH, abrasion, etc.

Alternatively, as described in PCT Publication No. 2017/018998, microbubbles, which are described as bubbles or capsules, are use introduce an acid or chelating agent into a well bore. The bubble may be configured to degrade under temperature or pressure, allowing the acid or chelating agent permeate through the bubble at certain temperature or pressure.

However, these disclosures have the same problem of releasing the acid too early in the wellbore, causing uneven etching, or not etching deep enough in the well bore.

As described in U.S. Pat. No. 8,047,282, in the endeavor of cementing operations, a treatment agent has been encapsulated in a material susceptible to acoustic activation. At a predetermined time, an acoustic emission source is activated, degrading the encapsulant, and releasing the treatment agent to improve the cement composition.

However, it is still desirable to develop a method of descaling more uniformly or acidizing a hydrocarbon-bearing formation at a desired location, using a system that allows the user to target the location for distribution.

SUMMARY OF THE CLAIMED EMBODIMENTS

In one aspect, embodiments disclosed herein relate to a method for wellbore treatment. The method includes preparing an encapsulated treatment agent via polymerization, feeding the encapsulated treatment agent into the wellbore, delivering the encapsulated treatment agent to a desired depth within a formation in the wellbore, activating an acoustic or an electromagnetic source at the desired depth within the formation, and generating an acoustic field or an electromagnetic field. The acoustic field or electromagnetic field activates the encapsulant thereby releasing the treatment agent.

In another aspect, embodiments disclosed herein relate to an encapsulated treatment agent. The encapsulated treatment agent includes an encapsulant, and a treatment agent. The treatment agent includes a descaling agent, an acid stimulation agent, a scale dissolver, a scale inhibitor, a hydrate inhibitor, a halite inhibitor, a corrosion inhibitor, a biocide, a wax or asphaltene control substance, a demulsifier, a gel breaker, a drag reducer, an oxygen scavenger, a foaming agent, a surfactant, a well clean up agent, or combinations thereof.

Other aspects and advantages will be apparent from the following description and the appended claims.

BRIEF DESCRIPTION OF DRAWINGS

The FIGURE illustrates a system for targeted delivery of treatment agent into a well bore according to one or more embodiments disclosed herein.

DETAILED DESCRIPTION

In order to solve the problems associated with targeted acid delivery in well bores, one or more embodiments disclosed herein relate to methods and systems for targeted chemical treatment of well bores using at least one acoustic or electromagnetic (EM) source, or both, systems for introducing the microcapsules containing chemical agents, or treatment agents, into the borehole and transporting the agents to the treatment zone. The source may be used to produce an acoustic or electromagnetic field in the borehole. The field may be configured to release the treatment agent from the microcapsule at the desired location. The method may further include using the same or another source to enhance the efficiency of the agent. In a first scenario, the method may further include using descaling agent released by acoustic field from the microcapsules for targeted dissolution of the scale deposits. In a second scenario, the method may further include using acid or acid precursors released by field from the microcapsules for acid stimulation, thereby restoring or improving an oil or gas well's productivity by dissolving material in the productive formation that is restricting flow, or to dissolve formation rock itself to enhance existing, or to create new, flow paths to the wellbore.

Regarding the first scenario, embodiments disclosed herein may include cases when various precipitates may form scales on the borehole wall, obstructing the flow hydrocarbons. Accordingly, having the ability to remove such deposits in targeted manner would increase the efficiency of the process and reduce the amount of treatment agent required. Existing approaches have drawbacks such as using excessive amount of the agent, exposing to the agent other parts of the wellbore, which are not the treatment target, requiring shutting the well for significant time, requiring intervention operations (e.g., introducing slickline or wireline tool, etc.), etc. According to embodiment disclosed herein, these drawbacks may be overcome.

Regarding the second scenario, embodiments may include increasing the rate at which the formation delivers hydrocarbons naturally by utilizing acid stimulation treatment. Acid stimulation jobs intend to clean fractures by dissolving secondary minerals or drilling mud and mobilizing them for an efficient removal by flow transport. By dissolving acid soluble components within underground rock formations, or removing material at the wellbore face, the rate of flow of oil or gas out of production well, or the rate of flow of oil-displacing fluids into injection well, may be increased. Acidization procedure involves directly injecting strong mineral acids such as hydrochloric acid (HCl) or hydrofluoric acid (HF) into the well. However, the high reactivity of such strong acids commonly results in the rapid consumption of the acid before it can reach the desired treatment region where the filter cake was located. Further, such acids are highly corrosive and thus attack the metal parts of the well structure, causing irreversible damage to the well. Therefore, according to embodiments disclosed herein, development of the targeted chemical treatment methodology may overcome such drawbacks to the conventional processes of acid stimulation.

While principally described with respect to descaling and acid stimulation processes, one or more embodiments disclosed herein may also include addressing salt formation, paraffin deposition, emulsification (both water-in-oil and oil-in-water), gas hydrate formation, corrosion, asphaltene precipitation, and paraffin formation.

According to one or more embodiments disclosed herein, the system and method may include an acoustic or electromagnetic (EM) wave field generating source, or both, which may be disposed within the formation, using the source to generate the acoustic/EM field, and using the generated field to facilitate destroying the microcapsules' shells to release the agent.

The wavefield which may generated by the source may be different depending on the type of source used. For example, an acoustic source, which may be a piezoelectric transducer, may operate in the ultrasonic frequency range of between 1-500 kHz (throughout the specification Hz is the frequency unit of "hertz," where kHz is kilohertz, GHz is gigahertz, etc.). The EM source may operate in the frequency range of between 10 kHz and 20 GHz, such as between 10 kHz and 2000 kHz. The frequency range may be selected in such a manner such that the field is effective for facilitating shell destruction depending on the material selected for the shell, which is described below. Additionally, the penetration depth of the field may be inversely proportional to the frequency. This may be because the attenuation factor of the deposits/formation can be assumed not to vary by the order of magnitude in sonic/ultrasonic frequency range. Therefore, if the penetration inside the formation is required, the frequency may be kept at a lower level of the useful frequency band. Again, the exact frequency range may be selected based on the microcapsule structure, as well as the depth of penetration within the well bore.

Further, in one or more embodiments, the acoustic or EM source, or both, may be selected and/or tuned to generate a desired wavefield. This may be achieved by using focusing sources, such as metal plates or cones, or arrays of sources such as using multiple sources arranged in a grid or a 3D shape depending on the formation geometry. The advantage of such focusing arrangements may be better localization of the treatment zone, thereby reducing the amount of treatment agent needed. Alternatively, less focused field may provide larger affected volume and larger amount of released agent, if the formation desired to be treated is large. Additionally, in embodiments where multiple sources are used in a grid or array, the sources may be activated simultaneously or with a time delay to form and direct the beam to the desired formation target.

In addition, the source(s) may be used to manipulate microcapsules and/or released agent to move the capsule or agent to the desired location, keep them in place, etc. This may be done by means of manipulating the acoustic/EM radiation force and configuring the acoustic field accordingly. The manipulation can be done by the same source, which is used to facilitate breakdown of the microcapsules, or different source. The frequency range used for moving, or trapping, the microcapsules may be the same or different from those used to breakdown the microcapsules. In embodiments where a different frequency range is used, the frequency range may be in the range of 10 kHz to 3000 kHz.

In one or more embodiments, the destruction of the microcapsules may be facilitated by EM field within the frequency of 20 kHz to 20 GHz, while the manipulation of the microcapsules may be done by an acoustic source field within the frequency range of 10 kHz to 3000 kHz. The individual EM source and acoustic source may be on different arrays, or may be part of the same array. Further, the two different sources may be activated simultaneously, or in series, depending on the desires target within the formation, the properties of microcapsule material, and depth of penetration.

Using the above described system and method, improved descaling within the formation may be achieved. Once it is determined that descaling in a particular part of the formation is required, a ball device may be sent (e.g., using fluid pressure pulse link, or other conventional means) to the treatment position. Upon the ball valve reaching the desired target, the encapsulated agent may be injected into the well bore with the fluid flow or in another ball. Once the microcapsule encapsulated agent reaches the target location, they may be activated by a downhole acoustic/EM source, according to one or more embodiments herein. Thus, the loss and/or premature action of the encapsulated agent are avoided and there is no necessity for more severe well intervention operations. The same process may be used for acid stimulation procedures as well.

As already discussed, such targeted processes may avoid shutting the well for the tool operation, ensure the activation of the agent at targeted zones, where the treatment is required, and avoid losing the agent in zones different from the targeted one.

The method, and composition, of the microcapsules will now be discussed. This method may be performed in advance of the well treatment operation and stored on site, ready for use. In other embodiments, chemical methods can be used to form microcapsules by in-situ reaction. The process of forming microcapsules may include physical methods, chemical methods, or a combined physio-chemical method.

In one or more embodiments, a chemical method forms microcapsules by in-situ polymerization of monomers distributed in an emulsion containing one or more oil field chemicals or treatment agent. The term "emulsion" is used to describe a fine dispersion of a first liquid in a second liquid in which the first liquid is not soluble or miscible. The term "emulsion" as used herein, includes microemulsion, mini-emulsion, normal emulsions, and suspensions. An emulsion can be a discontinuous, internal oil-phase in a continuous water phase (or, O/W), or an internal water-phase in a continuous oil phase (or, W/O). The emulsion may be more complicated with an internal phase itself being a dispersion, thus a W/O/W or O/W/O type of emulsion. The polymerization may occur in the water phase, the oil phase, the interphase between water and oil phases, more than one of the above phases, or in all of the above phases. Thus, the polymerization can be termed emulsion polymerization, mini-emulsion polymerization, microemulsion polymerization, suspension polymerization, colloid polymerization, or interfacial polymerization. The polymerization can be either addition polymerization of vinyl monomers, or condensation polymerization of corresponding monomers and prepolymers. Initiators and/or catalysts may be used, as necessary. Examples of suitable vinyl monomers are acrylamide, acrylic acid, acrylic esters, methacrylic acid, methacrylic esters, styrene, 4-vinylbenzyl chloride, divinylbenzene, and methylenebisacrylamide. Examples of suitable condensation polymers are melamine-formaldehyde resin, phenol-formaldehyde resin, urea-formaldehyde resin, epoxy resin, urethane/urea resin, and polyester resin.

The shell of the microcapsule may be made of a polymer made from one or more monomers selected from the group consisting of a melamine-formaldehyde, a urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, z polyether, a polyimide, a polyolefin, polypropylene-polyethylene copolymers, polystyrene, functionalized polystyrene derivatives, gelatin, a gelatin derivative, cellulose, a cellulose derivative, starch or a starch derivative, a polyvinyl alcohol, an ethylene-vinylacetate copolymer, a maleic-anhydride based copolymer, a polyacrylamide, a polyacrylamide based copolymer, a polyacrylic acid, a polyacrylic acid based copolymer, a polyvinylpyrrolidone, a polyvinylpyrrolidone based copolymer, a polyacrylate based copolymer, a polyacrylamide, a polyacrylamide based copolymer, propylene-acrylate copolymer, propylene-methacrylate copolymers, oxidized polypropylene, oxidized polyethylene, propylene-ethylene oxide copolymers, styrene-acrylate copolymers, and acrylonitrile-butadiene-styrene copolymers, and mixtures thereof. A Pickering stabilizer may be used, in one or more embodiments. The above described polymers are suitable for one or more of the above described polymerization methods.

The one or more well treatment agents, which may be encapsulated in the above described polymer encapsulant, may refers to any compounds or mixtures placed within a well or hydrocarbon reservoir to address various undesired effects caused by a variety of conditions including, but not limited to scale formation, salt formation, paraffin deposition, emulsification (both water-in-oil and oil-in-water), gas hydrate formation, corrosion, asphaltene precipitation, and paraffin formation. Well treatment agents may include, but are not limited to, scale dissolvers, scale inhibitors, hydrate inhibitors, halite inhibitors, corrosion inhibitors, biocides, wax and asphaltene control substances, demulsifiers, gel breakers, drag reducers, oxygen scavengers, foaming agents, surfactants, and well clean up agents such as enzymes; organic molecules, acids, esters, and aliphatic compounds.

In one or more embodiments where descaling processes are required, the acid based scale dissolvers may include, but not limited to, hydrochloride acid, acetic acid, formic acid, citric acid, lactic acid, methanesulfonic acid (MSA), or mixture of these acids. The chelant based scale dissolvers may include, but are not limited to, ethylenediaminetetraacetic acid (EDTA), diethylenetriaminepentaacetic acid (DTPA), tetrasodium glutamate diacetate (GLDA), nitrilotriacetic acid (NTA), citrate, pyrophosphate (P2O7), and tetrakis(hydroxymethyl)phosphonium sulfate (THPS), or mixture thereof.

In one or more embodiments where scale inhibition is required, the scale inhibitors may include, but are not limited to, polyphosphate, 1-hydroxyethylidenediphosphonic acid (HDEP), ethane-1,2-diphosphonic acid (EDPA), diethylenetriaminepenta(methylenephosphonic acid (DETPMP), tris (phosphonomethyl)amine, nitrilotrimethylphosphonic acid, aminotris methylphosphonic acid (ATMP), bis(hexamethylenetriaminepenta(methylenephosphonic acid)) (BHTMP), 1-hydroxyethylidene-1,1-diphosphonic acid (HEDP), [[(2-hydroxyethyl)imino]bis(methylene)]bisphosphonic acid (MEA/HADMP), polyacrylic acid (PAA), polymaleic acid (PMA), polyphosphinocarboxylic acid (PPCA), polyvinyl sulfonate and polyacrylic acid copolymer (PVS), phosphonocarboxylic acid (POCA) and 2-phosphono-butane-1, 2, 4-tricarboxylic acid (PBTC), polyamino polyether methylene phosphonae (PAPEMP), polyaspartate, or mixtures thereof.

In one or more embodiments where gas hydrate inhibition is required, the gas hydrate inhibitors may include, but are not limited to, methanol, ethylene glycol, glycopeptides, poly(N-vinylpyrrolidone) (PVP), tyrosine derivatives, terpolymer of N-vinylcaprolactam, N-vinylpyrrolidone and dimethylaminoethylmethacrylate, isobutylene succinate diester of monomethylpolyethylene glycol, hydroxyethylcellulose (HEC), alkyl aryl sulhonic acids, ethoxylated sorbitan monolaurate, alkyl polyglycoside, tetraoxyethylenenonylphenylether, or mixtures thereof.

In one or more embodiments where halite inhibition is required, the halite inhibitors may include, but are not limited to, nitrilotriacetic acid (NTA) and potassium hexacyanoferrate (HCF).

In one or more embodiments where corrosion inhibition is required, the corrosion inhibitors may include, but are not limited to, imidazoline, primary/secondary/tertiary/quaternary amines, n-dodecylamine, N—N-dimethyl dodecylamine, amide, amidoamine, amidoimidazoline, isoxazolidine, succinic acid, carboxylic acid, aldehyde, alkanolamine, imidazoline-imidazolidine compound, α,β-ethylene unsaturated aldehyde, polyalkylenepolyamine, diethylenetriamine, or mixtures thereof.

In one or more embodiments where biocide inhibition is required, the biocides may include, but are not limited to, glutaraldehyde, tetrakis(hydroxymethyl)phosphonium sulfate (THPS), alkyldimethylbenzylammonium chloride (ADBAC), didecyldimethylammonium chloride (DDAC), tributyl(tetradecyl)phosphonium chloride (TTPC), cocodiamine, 2,2-dibromo-3-nitrilopropionamide (DBNPA), 2-bromo-2-nitro-1,3-propanediol, tetrahydro-3,5-dimethyl-2H-1,3,5-thiadiazinethione, 5-chloro-2-methyl-4-isothiazolin-3-one+2-methyl-4-isothiazolin-3-one (CMIT/MIT), 4,4-dimethyloxazolidine (DMO), 1-(3-chloroallyl)-3,5,7-triaza-1-azoniaadamantane chloride (CTAC), tris(hydroxymethyl) nitromethane (THNM), sodium hypochlorite, ozone, chlorine dioxide, peracetic acid, and combinations thereof.

In one or more embodiments where wax control is required, the wax control substances may, include but are not limited to, poly(ethylene-co-vinyl acetate)(EVA), ethylene/acrylonitrile copolymers, poly (ethylene-b-propylene), poly (ethylene butene) polymers, (meth)acrylic acid and maleic anhydride co-polymers, polyesters, amine ethoxylates, alkyl sulfonates, alkyl aryl sulfonates, fatty amine ethoxylates, and mixtures thereof.

In one or more embodiments where asphaltene control is required, the asphaltene control substances may include, but are not limited to, xylene, n-butylisoquinolinium chloride ionic liquid, amphiphil P (n-dodecyl) benzene sulfonic acid, vegetable oil, coconut essential oil, sweet almond, andiroba and sandalwood oil, boscan resins, cerro negro resins, 1-allyl-3-hexadécylimidazolium bromide, dodecyl benzene sulfonic acid (DBSA), dodecyl trimethyl ammonium bromide (DTAB), light cycle oil (LCO), $TiO_2$ nanoparticles, surfactant (SDJ), nanofluids of $Al_2O_3$, propoxylated polydodecyl, phenol formaldehyde, octylphenol, dodecyl phenol, 2-hydroxybenzenecarboxcylic acid $C_6H_4(OH)COOH$ salicylic acid, and combinations thereof.

In one or more embodiments where demulsifying is required, the demulsifiers may include, but are not limited to, urea, polyethylene glycol, diethylene glycol, propylene glycol, fatty alcohol ethoxylate, monoethylene glycol, triethanolamine, 2-ethyl hexyl acrylate, methacrylic acid, sodium dodecyl sulfate, butyl acrylate, acrylic acid anhydrous, methyl methacrylate, naphthalene, methyl trioctyl ammonium chloride (TOMAC), dioctylamine, and mixtures thereof.

In one or more embodiments where gel breaking is required, the gel breakers may include, but are not limited to, enzyme, polyacrylamide, guar, sodium hypochlorite, ammonium peroxide, hydrogen peroxide, and combinations thereof.

In one or more embodiments where drag reduction is required, the drag reducers may include, but are not limited to, polyethylene, copolymer of a linear α-olefin with crosslinkers, polyacrylamides, polyalkylene oxide, fluorocarbons, fluorocarbons, polyalkylmethacrylates, terpolymer of styrene, alkyl acrylate, and AA or methacrylic, and combinations thereof.

In one or more embodiments where oxygen scavenging is required, the oxygen scavengers may include, but are not limited to, sulfite ($SO_3^{-2}$) and bisulfite ($HSO_3^-$) ions, diethylhydroxylamine (DEHA), and combinations thereof.

In one or more embodiments where foaming is required, the foaming agents may include, but are not limited to, azodicarbonamide, inorganic bicarbonates (sodium, potassium, aluminum, iron bicarbonates), sodium dodecyl sulfate, azodicarbonamide, benzenesulfonyl hydrazide, dinitrosopentamethylene tetramine, toluenesulfonyl hydrazide, azobisisobutyronitrile, barium azodicarboxylate, and combinations thereof.

In one or more embodiments where surfactants are required, the surfactants may include, but are not limited to, sodium dodecyl sulfate, tris(hydroxymethyl)aminoethane dodecyl sulfate, sodium dodecyl sulfonate, sodium cholate, sodium taurocholate, sodium deoxycholate, sodium taurodeoxycholate, sodium N-dodecanoyl-N-methyltaurine, lithium perfluorooctanesulfonate, tetradecyltrimethylammonium bromide, hexadecyltrimethylammonium bromide, carboxybetaine ($—NR_2CH_2COO^-$), sulfobetaine ($—N(CH_3)_2 C_3H_6SO_3^-$), and quaternary ammonium ($—R_4N+$), alcohol ethoxylates, alkyl phenol ethoxylates, fatty acid ethoxylates, monoalkaolamide ethoxylates, sorbitan ester ethoxylates, fatty amine ethoxylates, ethylene oxide-propylene oxide copolymers, glycol esters, glycerol and polyglycerol esters, glucosides and polyglucosides, sucrose esters, and combinations thereof.

Above described acid systems can be broadly classified into the following groups: mineral acids which includes hydrochloric acid, hydrofluoric acid and mixtures of hydrochloric-hydrofluoric acid; organic acids which include formic acid; and acetic acid; powdered solid acids such as sulfamic acid, and chloroacetic acid; mixed acid systems such as acetic-hydrochloric acid, formic-hydrochloric acid; formic-hydrofluoric acid; retarded acid systems for example gelled acids, chemically retarded acids, and emulsified acids.

Concentrated acids may be chemically retarded for the purpose of microcapsule formation. Chemical retardation may be performed by forming a gel structure inside the acid with a gelling agent. Suitable gelling agents may include, but are not limited to, xanthan polymers (XP), guar gum (GG), hydroxyethyl cellulose (HEC), carboxymethyl-hydroxyethyl cellulose (CMHEC), polyacrylamide (PAM), polyvinyl alcohol (PVA), polyvinyl-pyrrolidone (PVP), and acrylamide/sodium-2-acrylamido-2-methylpropane sulfonate copolymer (PAM/AMPS).

Gelled acid-containing microcapsules may be synthesized primarily by a physical method of core-shell hot melt extrusion where the concentric nozzle system is used. In core-shell hot melt extrusion, the solution of a gelled acid passes through an internal nozzle, while the shell-forming material in the melt phase passes through the external nozzle, resulting in the formation of a laminar flow liquid jet. A controlled, superimposed vibrational frequency at defined amplitude is then imposed onto this jet and causes the jet to break-up into small uniform droplets of equal size, with one droplet formed per hertz of frequency applied. Thus, higher frequencies will produce a greater number of smaller droplets, and lower frequencies will produce a lower number of larger droplets. After formation the produced droplets are then converted subsequently into microcapsules. Shell forming materials which may be used in core-shell hot melt extrusion may include, but are not limited to, polyethylene, polypropylene, poly(1-butene), poly(methyl methacrylate), polyvinyl chloride.

Turning now the FIGURE, a diagram of a well environment in accordance with one or more embodiments is illustrated. In the illustrated embodiment, the well environment 100 includes a hydrocarbon-bearing formation 102 located in a subsurface formation ("formation") 104 and a well system 106.

The formation 104 may include a porous or fractured rock formation that resides underground, beneath the surface 108 of the Earth. The surface 108 may be dry land or ocean bottom. The well system 106 may be for a hydrocarbon well, such as an oil well, a gas well, a gas condensate well, or a mixture of hydrocarbon-bearing fluids. The hydrocarbon-bearing formation 102 may be a hydrocarbon reservoir defined by a portion of the formation 104 that contains (or that is at least determined to or expected to contain) a subsurface pool of hydrocarbons, such as oil and gas. The formation 104 and the hydrocarbon-bearing formation 102 may each include different layers of rock having varying characteristics, such as degree of density, permeability, porosity, and fluid saturations. In the case of the well system 106 being operated as a production well, the well system 106 may facilitate the extraction of hydrocarbons (or "production") from the hydrocarbon-bearing formation 102. In the case of the well system 106 being operated as an injection well, the well system 106 may facilitate the injection of substances, such as a gas or water, into the hydrocarbon-bearing formation 102. In the case of the well system 106 being operated as a monitoring well, the well system 106 may facilitate the monitoring of various characteristics of the formation 104 or the hydrocarbon-bearing formation 102, such as reservoir pressure or saturation. Encapsulated treatment agents may be used in all of the above described well systems.

The well bore 120 may be created, for example, by the drilling system 130 boring through the formation 104. In some embodiments, the drilling system 130 includes a drilling rig 132 and a drill string 134.

The well system 106 may include a well bore 120 and a drilling system 130. The well bore 120 may include a bored hole that extends from the surface 108 into a target zone of the formation 104, such as the hydrocarbon-bearing formation 102. Well bore 120 is defined by well bore wall 124. Although shown as a vertical well, well bore 120 may take a deviated or horizontal configuration, the embodiment methods and systems are adaptable and applicable to all wellbore configuration types.

During formation treatment, the drill string 134 may include a treatment tool 136 deposed into a target treatment area 138. In some embodiments, the formation tool 136 may include a ball valve device, acoustic and/or EM source, and one or more injection nozzles for injecting encapsulated treatment agent into the target treatment area 138. Once a target treatment area 138 is identified, a ball may be introduced into drill string 134, triggering the injection on the encapsulated treatment agent into targeted treatment area 138 and activation of the acoustic and/or EM source. The acoustic and/or EM field generated by the acoustic and/or EM source degrades the encapsulant the treatment agent is released at the desired time and location.

The wellbore 120 may provide for the injected of encapsulated treatment agent through line 190. The encapsulated treatment agent may be stored in vessel 186 until a targeted treatment area 138 is identified. In one or more embodiments, fluids collected from the target treatment area 138 may be returned to the surface 108 through the annulus of well bore 120. Upon reaching the surface 108, the collected fluids may be transferred to a receiving tank 184, where the level of mud and dissolved gases may monitored. In addition, in the receiving tank 184 the fluid is agitated such that it releases any dissolved gases. The remaining liquid may be transferred back to the encapsulated treatment agent 186 as a fluidization medium.

Accordingly, acoustically/EM activated well treatment is provided by the system and the method described above, according to one or more embodiments herein. The system and method may be used to deliver the treatment agents downhole to a targeted treatment zone, activate the encapsulate, and release the treatment agent into the formation.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A method for wellbore treatment, the method comprising:
   preparing an encapsulated descaling agent via in-situ polymerization of one or more monomers distributed in an emulsion containing a descaling agent, wherein the polymerization of the one or more monomers forms an encapsulant shell around a core of the descaling agent;
   feeding the encapsulated treatment agent into the wellbore;
   delivering the encapsulated descaling agent to a desired depth within a formation in the wellbore;
   activating an acoustic or an electromagnetic source at the desired depth within the formation, generating an acoustic field, the acoustic field destroying the encapsulant shell thereby releasing the descaling agent.

2. The method of claim 1, wherein the acoustic field is at a frequency of between 1 and 500 kHz.

3. The method of claim 1, wherein the electromagnetic field is at a frequency of between 10 kHz to 20 GHz.

4. The method of claim 1, further comprising focusing the acoustic field using one or more plates or cones, creating a targeted treatment zone.

5. The method of claim 1, wherein the one or more monomers are selected from the group consisting of a melamine-formaldehyde, a urea-formaldehyde, a phenol-formaldehyde resin, a melamine-phenol-formaldehyde resin, a furan-formaldehyde resin, an epoxy resin, a polysiloxane, a polyacrylate, a polyester, a polyurethane, a polyamide, z polyether, a polyimide, a polyolefin, polypropylene-polyethylene copolymers, polystyrene, functionalized polystyrene derivatives, gelatin, a gelatin derivative, cellulose, a cellulose derivative, starch or a starch derivative, a polyvinyl alcohol, an ethylene-vinylacetate copolymer, a maleic-anhydride based copolymer, a polyacrylamide, a polyacrylamide based copolymer, a polyacrylic acid, a polyacrylic acid based copolymer, a polyvinylpyrrolidone, a polyvinylpyrrolidone based copolymer, a polyacrylate based copolymer, a polyacrylamide, a polyacrylamide based copolymer, a propylene-acrylate copolymer, propylene-methacrylate copolymers, oxidized polypropylene, oxidized polyethylene, propylene-ethylene oxide copolymers, styrene-acrylate copolymers, and acrylonitrile-butadiene-styrene copolymers, and mixtures thereof.

6. The method of claim 1, wherein the activation is performed via an acoustic source and an electromagnetic source.

7. The method of claim 6, further comprising activating the acoustic source before the electromagnetic source.

8. The method of claim 6, further comprising activating the acoustic source after the electromagnetic source.

9. The method of claim 6, further comprising activating the acoustic source and the electromagnetic source together.

* * * * *